US011129047B2

(12) United States Patent
Wu et al.

(10) Patent No.: US 11,129,047 B2
(45) Date of Patent: Sep. 21, 2021

(54) RADIO LINK CONTROL STATUS REPORTING

(71) Applicant: Nokia Technologies Oy, Espoo (FI)

(72) Inventors: Chunli Wu, Beijing (CN); Samuli Heikki Turtinen, Ii (FI); Esa Malkamäki, Espoo (FI); Benoist Pierre Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 32 days.

(21) Appl. No.: 16/610,611

(22) PCT Filed: May 4, 2018

(86) PCT No.: PCT/IB2018/053131
§ 371 (c)(1),
(2) Date: Nov. 4, 2019

(87) PCT Pub. No.: WO2018/203305
PCT Pub. Date: Nov. 8, 2018

(65) Prior Publication Data
US 2020/0077299 A1    Mar. 5, 2020

Related U.S. Application Data

(60) Provisional application No. 62/502,318, filed on May 5, 2017.

(51) Int. Cl.
*H04L 1/16* (2006.01)
*H04W 28/06* (2009.01)
(Continued)

(52) U.S. Cl.
CPC ......... *H04W 28/065* (2013.01); *H04L 1/1621* (2013.01); *H04L 1/1642* (2013.01); *H04L 1/1848* (2013.01); *H04W 80/02* (2013.01)

(58) Field of Classification Search
None
See application file for complete search history.

(56) References Cited

U.S. PATENT DOCUMENTS

2009/0175206 A1    7/2009  Wang et al.
2012/0240000 A1*   9/2012  Venkataraj ............ H04L 1/1822
                                                          714/751
(Continued)

FOREIGN PATENT DOCUMENTS

JP   H10-247901 A    9/1998
JP   2004-34355 A   12/2004
(Continued)

OTHER PUBLICATIONS

Extended European Search Report received for corresponding European Patent Application No. 18794227.1, dated Nov. 23, 2020, 11 pages.
(Continued)

*Primary Examiner* — Edan Orgad
*Assistant Examiner* — Emmanuel K Maglo
(74) *Attorney, Agent, or Firm* — Squire Patton Boggs (US) LLP

(57) ABSTRACT

Various communication systems may benefit from an enhanced radio link control status report. A method may include determining a negative acknowledgment sequence number range. The negative acknowledgment sequence number range may include a plurality of consecutive radio link control missing sequence numbers. The method may also include determining at least one of a negative acknowledgment end sequence number when the plurality of consecutive radio link control missing sequence numbers exceeds the negative acknowledgment sequence number range. In addition, the method may include sending a radio link control status report comprising at least one of a negative acknowledgment sequence number, the negative (Continued)

acknowledgment sequence number range, or the negative acknowledgment end sequence number when the plurality of consecutive radio link control missing sequence numbers exceeds the at least one negative acknowledgment sequence number range.

8 Claims, 6 Drawing Sheets

(51) Int. Cl.
  *H04L 1/18* (2006.01)
  *H04W 80/02* (2009.01)

(56) References Cited

U.S. PATENT DOCUMENTS

| | | | |
|---|---|---|---|
| 2012/0314648 A1 | 12/2012 | Zhang et al. | |
| 2018/0316619 A1* | 11/2018 | Hong | H04L 69/321 |
| 2018/0324637 A1* | 11/2018 | Deng | H04L 1/1621 |
| 2019/0306871 A1* | 10/2019 | Liu | H04W 80/02 |

FOREIGN PATENT DOCUMENTS

| | | |
|---|---|---|
| JP | 2014-064319 A | 4/2014 |
| JP | 2014-520450 A | 8/2014 |
| JP | 2014-529219 A | 10/2014 |
| WO | 2008/070682 A2 | 6/2008 |
| WO | 2011/019427 A2 | 2/2011 |
| WO | 2012/170724 A1 | 12/2012 |
| WO | 2013/023836 A1 | 2/2013 |

OTHER PUBLICATIONS

Office action received for corresponding Japanese Patent Application No. 2019-560336, dated Nov. 24, 2020, 3 pages of office action and 4 pages of Translation available.
"New SID Proposal: Study on New Radio Access Technology", 3GPP TSG-RAN Meeting #71, RP-160671, Agenda: 9.1, NTT Docomo, Mar. 7-10, 2016, 7 pages.
"New WID on New Radio Access Technology", 3GPP TSG-RAN Meeting #75, RP-170847, Agenda: 9.1, NTT Docomo, Inc, Mar. 6-9, 2017, 12 pages.
"3rd Generation Partnership Project; Technical Specification Group Radio Access Network; Evolved Universal Terrestrial Radio Access (E-UTRA); Radio Link Control (RLC) protocol specification (Release 14)", 3GPP TS 36.322, V14.0.0, Mar. 2017, pp. 1-45.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP TS 36.300, V14.2.0, Mar. 2017, pp. 1-330.
"TR 38.804 v0.7.0 on Study on New Radio Access Technology; Radio Interface Protocol Aspects", 3GPP TSG-RAN WG2 Meeting #97, R2-1702375, Agenda: 10.1, NTT Docomo, Inc, Feb. 13-17, 2017, 54 pages.
"Discussion on the format of NR RLC status PDU", 3GPP TSG-RAN2 Meeting #97bis, R2-1702941, Agenda: 103.23, OPPO, Apr. 3-7, 2017, pp. 1-3.
International Search Report and Written Opinion received for corresponding Patent Cooperation Treaty Application No. PCT/IB2018/053131, dated Oct. 5, 2018, 14 pages.
Office action received for corresponding Korean Patent Application No. 2019-7035960, dated Jan. 11, 2021, 7 pages of office action and 5 pages of Translation available.

* cited by examiner

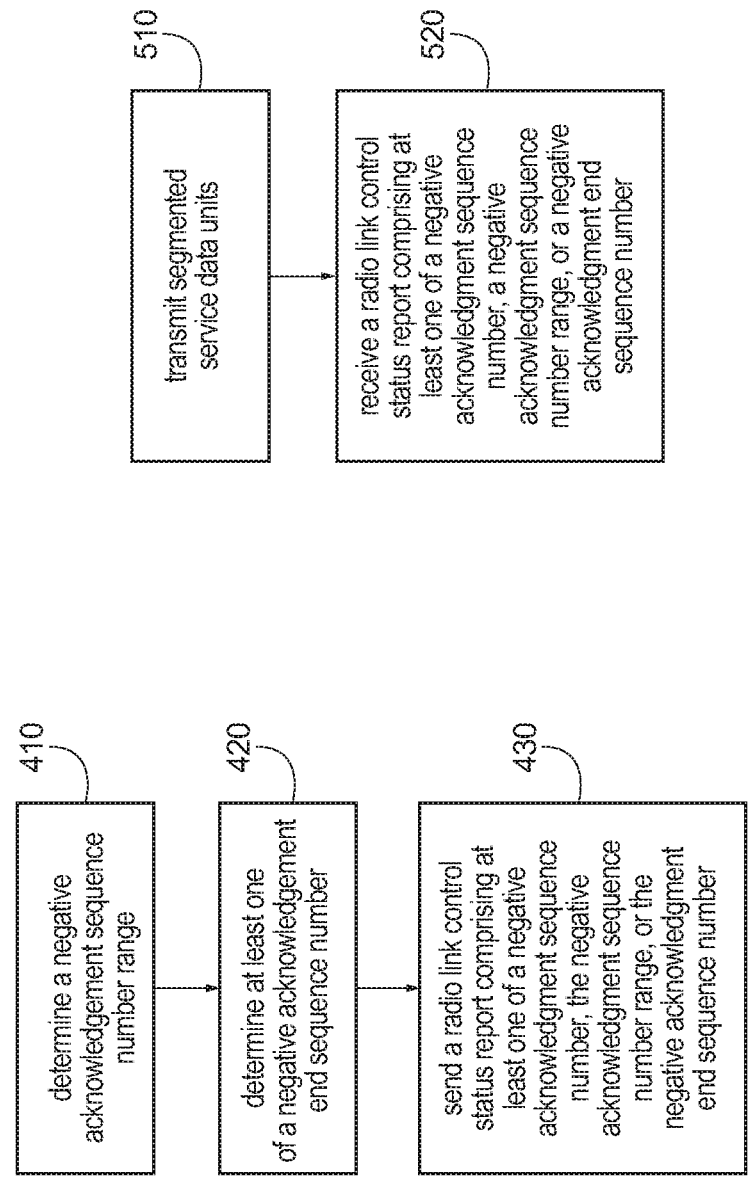

RADIO LINK CONTROL STATUS REPORTING

RELATED APPLICATION

This application was originally filed as PCT Application No. PCT/IB2018/053131, filed on May 4, 2018, which claims priority from U.S. provisional Application No. 62/502,318, filed on May 5, 2017.

BACKGROUND

Field

Various communication systems may benefit from an enhanced radio link control status report. For example, it may be helpful to improve the content of the radio link control status report in order to better manage New Radio technology.

Description of the Related Art

Recent third generation partnership project (3GPP) technology, such as fifth generation (5G) New Radio (NR) technology, have focused on the NR user plane (UP). In Long Term Evolution (LTE) or LTE-Advanced (LTE-A), the user plane included the following three layers: a packet data convergence protocol (PDCP), a radio link control (RLC), and a medium access control (MAC). In addition to the three above layers, NR also allows for a service data adaptation protocol (SDAP) placed above the NR PDCP to help facilitate a new quality of service (QoS) framework. The SDAP may also perform mapping between a QoS flow and a data radio bearer, and mark the QoS flow identification in both downlink and uplink packets.

In the NR RLC layer, segment offset (SO) based segmentation may be used for initial segmentation and/or re-segmentation. Segments of the same service data unit (SDU) in NR are therefore associated with the same RLC sequence number (SN). In LTE, on the other hand, involving framing information based initial segmentation, different SNs are assigned to SDU segments.

Unlike LTE RLC, the NR RLC layer does not support concatenation of RLC SDUs. Concatenation is the process of joining two or more SDUs together. Because of the lack of concatenation, there can be many RLC packet data units (PDUs) originating from a single RLC entity or logical channel that are mapped to a single transport block in the MAC layer. One lost transport block may therefore amount to many RLC PDUs lost.

BRIEF DESCRIPTION OF THE DRAWINGS

For proper understanding of the invention, reference should be made to the accompanying drawings, wherein:

FIG. 4 illustrates an example of a flow diagram according to certain embodiments.

FIG. 5 illustrates an example of a flow diagram according to certain embodiments.

DETAILED DESCRIPTION

In order to account for the differences between the LTE RLC and the NR RLC, the content of a RLC status report sent by a network entity and a user equipment may be improved. For example, the status report may include a negative acknowledgement SN range, and may also conditionally include a segment offset. The negative acknowledgment SN range may indicate a number of multiple consecutive missing RLC SNs after a reference SN, and optionally a negative acknowledgement SN end if the number of missing SNs exceeds an indicated range. The presence of the NACK_SN end may be indicated by a codepoint of NACK_SN_RANGE, as described in FIG. 3.

Figure 1:
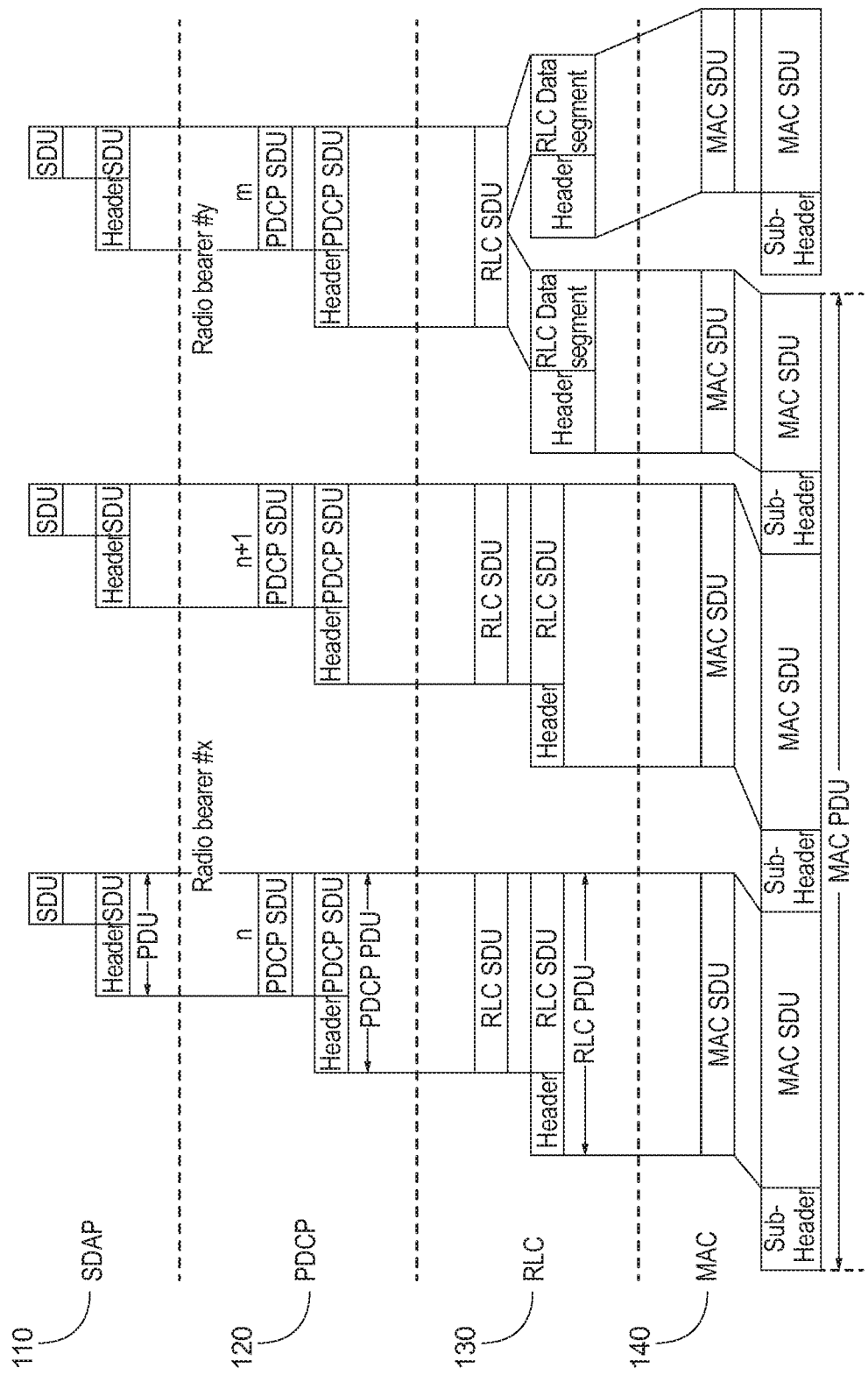
FIG. 1 illustrates a user plane architecture.

FIG. 1 illustrates a user plane network architecture. In particular, FIG. 1 illustrates a NR UP including SDAP 110, PDCP 120, RLC 130, and MAC 140. FIG. 1 illustrates two different radio bearers, radio bearer #x and radio bearer #y. Radio bearer #x may have an n number of PDUs, while radio bearer #y may have an m number of PDUs. PDCP 120 sublayer may perform header compression and/or decompression, reordering, transfer of user data, ciphering and/or deciphering, as well as time based SDU discard. In embodiments involving dual connectivity, PDCP may also perform PDCP PDU routing to associated links. At least some of the above functions of the PDCP rely on a PDCP SN located in the PDCP header of the PDCP PDU.

Located below PDCP sublayer 120 lies RLC sublayer 130. RLC sublayer 130 may help to facilitate the transfer of upper layer PDUs and perform error correction through automatic repeat request (ARQ) for acknowledgment mode (AM) data transfer. RLC sublayer 130 can also perform segmentation and re-segmentation for unacknowledged mode (UM) and AM data transfers, reassembly of RLC SDUs, duplicate detection for UM and AM data transfers, and/or protocol error detection for AM data transfers. In certain embodiments, these functions performed by RLC sublayer 130 may rely or be based on an RLC SN derived from the RLC header of every RLC PDU.

Below PDCP sublayer 120 and RLC sublayer 130 lies MAC sublayer 140. MAC sublayer 140 includes mapping between logical channels and transport channels, multiplexing/demultiplexing MAC SDUs belonging to one or more different logical channels delivered to/from the physical layer on the transport channel MAC sublayer 140 may also help to schedule information reporting, error correction through hybrid ARQ (HARQ), priority handling between logical channels of one user equipment, priority handling between user equipment by means of dynamic scheduling, transport format selection, and/or padding.

As discussed above, SDAP 110 has been added on top of the PDCP sublayer 110 in NR technology to support a new QoS framework. SDAP 110 may help to facilitate mapping between a QoS flow and a data radio bearer. SDAP 110 may also help to facilitate marking QoS flow identification in both downlink and uplink packets.

Figure 2:
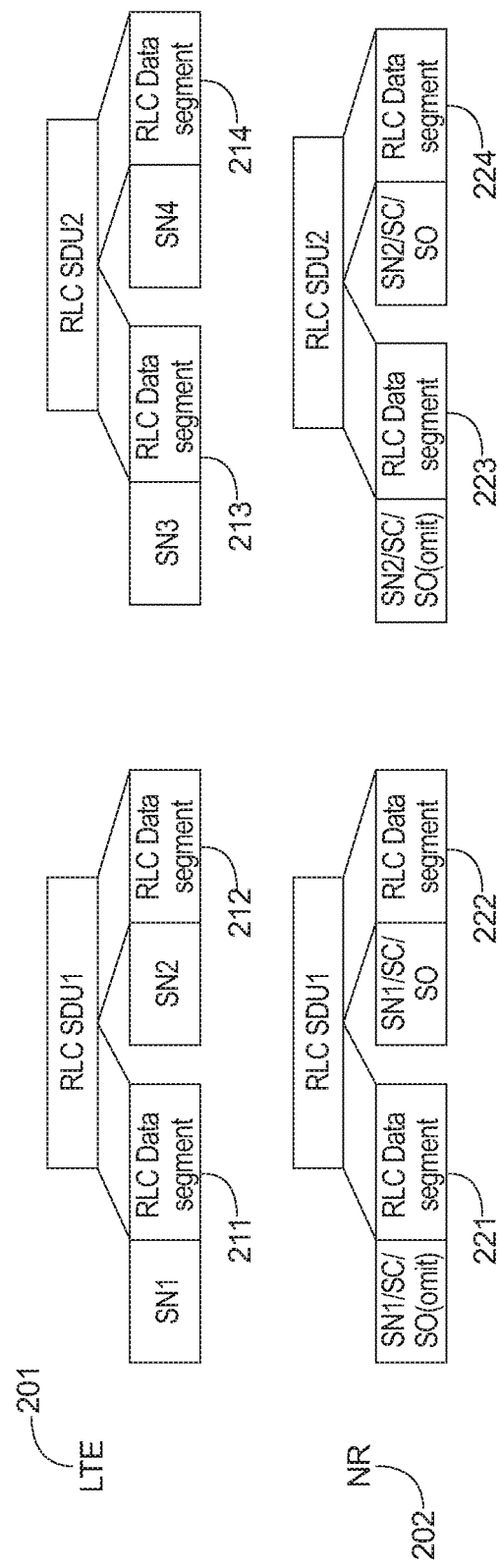
FIG. 2 illustrates an example of RLC segmentation.

FIG. 2 illustrates an example of RLC segmentation. In particular, FIG. 2 compares two different RLC SDUs in LTE 201 to two different RLC SDUs in NR 202. In LTE, the RLC in an AM mode made be responsible for both concatenation and segmentation to produce AMD PDUs. As can be seen, each PDU is assigned a different sequence number. As such, each RLC data segment within LTE RLC SDU 1 and LTE RLC SDU 2 has its own unique sequence number. Resegmentation may occur when an AMD PDU to be transmitted is too large to fit the transport block. RLC may then produce AMD PDU segments, with each segment using the same SN as the original PDU. As shown in FIG. 2, SN1 may be assigned to data segment 211, SN2 may be assigned to data segment of 212, SN3 may be assigned to data segment 213, and SN4 may be assigned to data segment 214.

On the other hand, each RLC data segment of the NR RLC SDU 1 and NR RLC SDU 2 may not be associated with different sequence numbers. As can be seen in FIG. 2, both RLC data segments 221 and 222 are associated with SN1, while RLC data segments 223 and 224 are associated with SN2. In addition, as can be seen in FIG. 1, NR RLC SDUs may include a segment control (SC) field that indicates whether the PDU segment is one of at least a first segment, a middle segment, or a last segment. The NR RLC SDUs may also include an SO offset when needed. SO may be used to identify the segment within the segmented original PDU. For example, the first RLC data segment of a new SDU may omit the SO associated with the data segment.

In accordance with LTE, the transmitting side of the AM RLC entity forms AMD PDUs from RLC SDUs. The transmitting side of the AM RLC entity may segment and/or concatenate the RLC SDUs so that the AMD PDUs fit within the total size of the RLC PDUs indicated by a lower layer at the particular transmission opportunity notified by the lower layer. In other words, the lower layer may determine the maximum size of the PDU. The transmitting side of the AM RLC entity may also support retransmission of the RLC PDUs. When a given RLC PDU to be retransmitted does not fit within the total size of RLC PDU indicated by lower layer at the particular transmission opportunity notified by the lower layer, the AM RLC entity may be segmented or resegmented into AMD PDU segments. The number of segments into which the SDU is divided may not be limited.

When the transmitting side of an AM RLC entity forms AMD PDUs from RLC SDUs received from an upper layer, or AMD PDU segments from RLC PDUs to be retransmitted, the transmitting side may include in the RLC PDU relevant RLC headers. In LTE using framing information based segmentation, a new transmission may always be an AMD PDU even though it may include one or more SDU segments. In some embodiments RLC status reports mat be transmitted between peer RLC entities. In the RLC status report, only a negative acknowledgment SN can follow an SO field in order to indicate which segment may be received from the original AMD PDU. The RLC status report may also include the acknowledgment SN field, which may indicate that the SN of the next not received RLC PDU which is not indicated as missing in the status report.

In accordance with LTE, t-ordering may be started when a gap is created, and the SN that started the t-reordering may be recorded. t-reordering may be a timer that may be used by the receiving side of the AM RLC entity to detect loss of RLC PDUs at the lower layer. The gap may be caused by a missing or yet to be received RLC segment. In embodiments involving LTE technology, at time period 1 SN1 may be received. VR(H), which is a state variable holding the value of the SN following the SN of the RLC data PDU with the highest SN among received RLC data PDUs, may equal two. VR(R), which is the state variable holding the value of the SN following the last in-sequence completely received AMD PDU that serves as the lower edge of the receiving window, may also equal two. In addition VR(MS), which may hold the highest possible value of the SN that can be indicated by an acknowledgment SN when a status report may be constructed, may be equal to two as well.

At time period 2, SN3 may be received without SN2 being received. VR(H) may equal 4, VR(R) may equal 2, VR(MS) may equal 2, while t-reordering may be started and VR(X), which may hold the value of the SN following the SN of the RLC data PDU which triggered t-reordering, may be equal to 4. At time period 3, at the expiration of t-reordering, a status report may indicate an acknowledgment sequence number that may equal 4, while the negative acknowledgment sequence number may be equal to 2.

While the process describe above may be used in LTE, the procedure may be problematic for NR. For NR, the gap can be created by a segment. For example, At time period 1, SN1 may be received, but segmentation information SC may indicate that the received transmission may not include a full SDU. SC may be a segmentation control field which indicates whether the received PDU contains a full SDU or a SDU segment and more precisely whether the SDU segment is the first, middle, or the last SDU segment. VR(H) may equal to 2, VR(R) may equal to 1, and/or VR(MS) may equal to 1. At time period 2, SN2 may be received but the SC may indicate that the received transmission may not include a full SDU, while the second segment of SN1 may be missing. In this embodiment, VR(H) may equal to 3, VR(R) may equal to 1, VR(MS) may equal to 1, while t-reordering may be started, and VR(X) may be equal to 2, which may be the SN following the SN that triggers the start of t-reordering.

At time period 3, when the t-reordering expires the status report indicates that an acknowledgment SN may be equal to 3, negative acknowledgment SN may be equal to 1, and the SO may be equal to X, which indicates that the second segment of SN1 may be missing. The value of X may be deduced or derived from reception of the first segment of SN1. A negative acknowledgment SN may also be equal to 2, while SO may be equal to Y, which indicates that the second segment of SN2 may be missing. Y may be deduced or derived from the reception of the first segment of SN2.

An acknowledgment of SN3 may be reported, and a negative acknowledgment of the second segment of SN2 may also be reported as missing. However, there may be a case that the second segment of SN2 may actually not even have been sent by the transmitter side yet during the duration of the t-reordering that started upon the reception of the first segment of SN2. Alternatively, the second segment that has just been sent, but the receiver side may not take the corresponding HARQ process carrying the second segment into account when constructing the status report.

In certain embodiments, the receiving side of each AM RLC entity may maintain various state variables, such as a receive state variable VR(R), a maximum acceptable receive state variable VR(MR), a t-reordering state variable VR(X), a maximum status transmit state variable VR(MS), and/or a highest received state variable VR(H). The various state variables may be described in 3GPP TS 36.322. 3GPP TS 36.322 is hereby incorporated by reference in its entirety.

VR(R) may hold the value of the SN following the last in-sequence completely received AMD PDU and/or RLC SDU, and it may serve as the lower edge of the receiving window. The VR(R) may be initially set to zero, and may be updated whenever the AM RLC entity receives an AMD PDU/RLC SDU with an SN equal to VR(R). VR(MR) may equal the VR(R) plus the AM_Window_Size, and may hold the value of the SN of the first AMD PDU/RLC SDU that may be beyond the receiving window. VR(MR) may also serve as the higher edge of the receiving window. VR(X) may be a variable that holds the value of the SN following the SN of the RLC data PDU which triggered t-reordering, while VR(MS) may have the highest possible value of the SN which can be indicated by an acknowledgment SN (ACK_SN) when a status report may be constructed. VR(MS) may be initially set to 0. VR(H) may hold the value of the SN following the SN of the RLC data PDU with the highest SN among received RLC data PDUs.

In certain embodiments, when a gap is created, such as an SN gap or a byte segment gap, t-reordering may be started, and the SN and/or the SO may be recorded, which indicates the next PDU/SDU SN or the next bytes of a segment of a PDU/SDU that may be received. The next PDU/SDU SN or the next bytes of a segment of a PDU/SDU that may be received may not to be reported as missing in the status report. The gap may be either a segment or a whole PDU/SDU. In NR technology, instead of t-reordering any other timer may be used, such as t-statusreport or any other equivalent, since no actual reordering may be performed in the NR RLC. The recorded SO may indicate the end byte of a received segment or the next byte not yet received.

Figure 3:
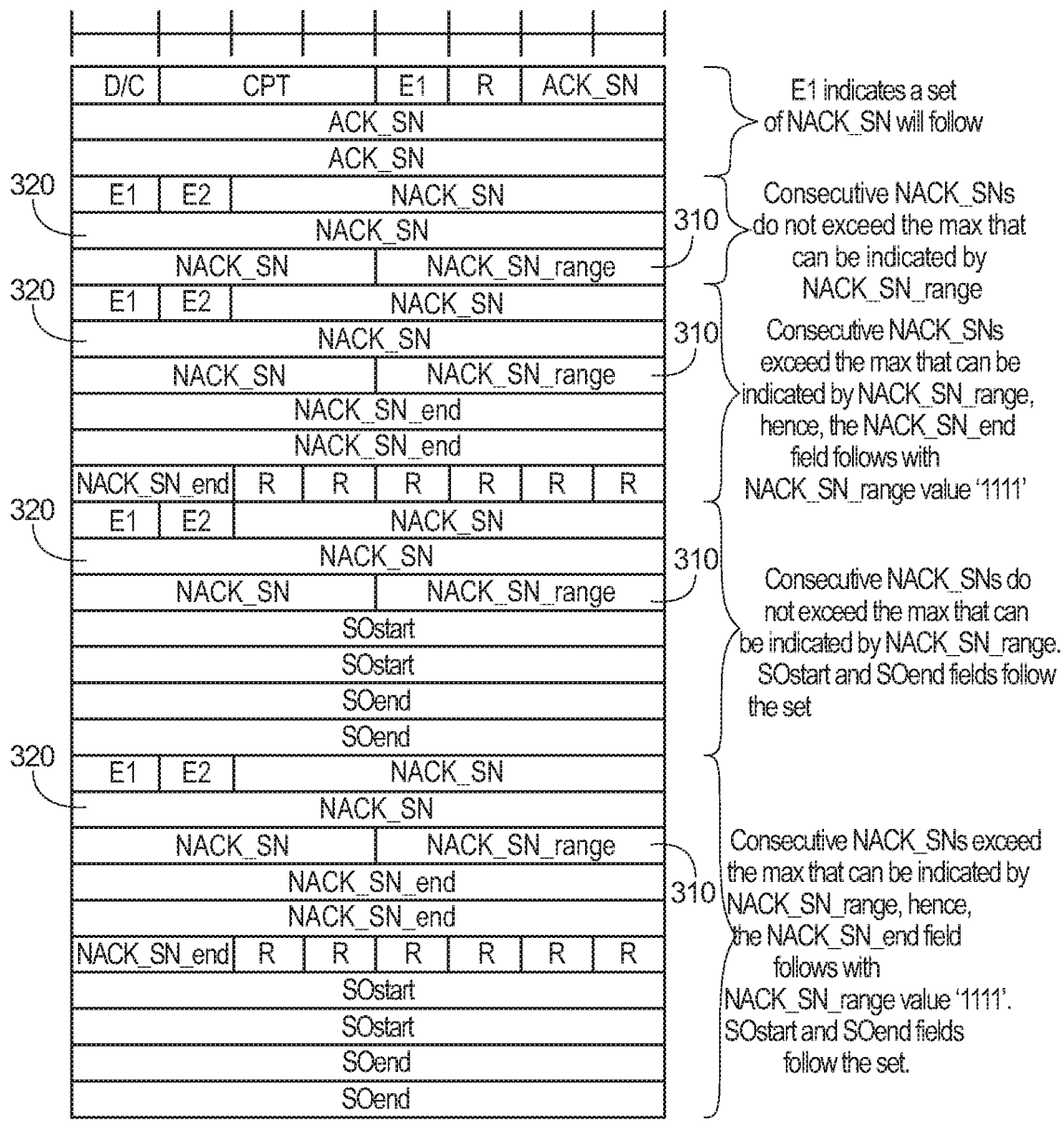
FIG. 3 illustrates an example of a status report according to certain embodiments.

In some embodiments, the status report may include the ACK_SN. In addition, the status report may also optionally include an SO of the ACK_SN when the next not received and/or not reported as missing may be a segment of the ACK_SN. The SO may indicate the end byte of a received segment or the start byte of a not yet received and/or not yet reported segment that may not be reported as missing in the status report. In certain embodiments, as shown in FIG. 3, the SO may follow the ACK_SN in the status report. Presence of SO may be indicated with a 1 bit flag or a different CPT value that may be allocated. In certain other embodiments, the SO may always be present in the status report.

In some embodiments, the status report may include a bit that may indicate that the first segment of ACK_SN has been received, and that the SO field may be excluded to indicate that the next not received PDU is a segment. For example, such embodiment may be applicable when a first AMD PDU segment may have been received, but not an AMD PDU segment including bytes immediately following the first AMD PDU segment.

In other embodiments, two bits could be encoded to form a framing information type field in an RLC status report, which may indicate whether the ACK_SN may be reported as a full SDU or as a first, middle, or last segment of the SDU. The framing information may be combined either preceding to or following the transmission of the ACK_SN. In an embodiment including a full SDU or a first segment, the SO field may not follow. In embodiments including a middle or a last segment, the SO field may follow. In other embodiments indicating a middle segment, there may be another SO field including both the SO_start and/or the SO_end values. A separate NACK_SN may then not be required for the first or a middle segment of the SDU, as the missing segment may be deduced from that information.

In some embodiments, the NACK_SN in the RLC status report may be allowed to be equal to ACK_SN in the same status report. The NACK_SN may indicate a missing segment before the highest byte that has already been received for the ACK_SN, and indicated by the SO following the ACK_SN.

In certain embodiments, the SO field for ACK_SN may not be encoded but the NACK_SN equal to ACK_SN may be used to report the missing segments of the ACK_SN. In such embodiments, NACK_SN may equal ACK_SN when the first segment of ACK_SN has been received and/or the last segment of the ACK_SN is received. In other words, in SO based segmentation for NR, certain embodiments may have the same SN as ACK_SN and NACK_SN, but with different SOs to address an embodiment in which the middle segment missing and the next expected segment may be from the same SDU.

In one example, RLC SDU 1 may be segmented into SN1 having a first segment and a second segment, and RLC SDU 2 may be segmented into SN2 with a first segment and a second segment. When a first segment of SN2 may be received, a second segment of SN1 may be missing, and t-status report may be started, SN2 with an SO equal to Y may be recorded. Y may be the next segment of the SN2 that has yet to be received. In some embodiments, Y may be deducted from the reception of the first segment of the SN2. When t-statusreport expires, the ACK_SN may be set to 2 and SO may be set to Y, indicating that the second segment of SN2 may not be reported as missing in this status report, while NACK_SN may be set to 1, while SO may be set to X. X may indicate that the second segment of the SN1 may be missing. Based on the ACK_SN and the NACK_SN, the transmission side may know the status of the PDUs before the SN may be equal to 2 and the SO may be equal to Y.

In certain embodiments, in a status report the same SN may be applied as an ACK_SN and a NACK_SN. In such embodiments, either the middle segment or end segment of the SDU may have been received while the first segment or the middle segment may not have been received. In some embodiments, in order to correctly start the status report timer and correctly report the receiver status, some of the RLC state variables may have to be updated to include both a SN and an SO. For example, VR(H) and VR(MS) may include an SO when a complete RLC SDU has not been received.

Including both the SN and the SO may allow the status report to correctly report the receiver status of the one or more received segment. As discussed above, only including the SN without the SO may not be enough for an ACK_SN since SO based segments may have the same SN. The status report may not request transmission of a segment that has yet to be transmitted at all, or a segment that was transmitted after a predetermined time in which the receiving RLC entity did not take any additional transmission into account when constructing the status report. The format of the status report may then be optimized by using SO based segmentation.

The status report used in LTE generates high overhead since each SDU may need to be indicated as missing with its own NACK-SN. In an NR RLC, which does not utilize concatenation, this increased overhead may decrease network efficiency. In certain embodiments, therefore, the RLC status report may include both NACK_SN range as well as a NACK_SN_start and/or NACK_SN_end. The presence of NACK_SN_range field in the STATUS PDU, for example, may be indicated by an extension bit preceding the start of each new NACK_SN. A status report may be referred to as a STATUS PDU. In other embodiments, the NACK_SN_range field may be present following each new NACK_SN with an option all 0 bits indicating only one SN negative acknowledgment. For example, a bit sequence of 000 may follow each new NACK_SN if the only one SN may be negatively acknowledged.

When the amount of consecutive NACK_SNs to be indicated may exceed the space given by the NACK_SN_range, the NACK_SN_range special value 000 may be used to indicate the existence of the NACK_SN_end. This may be applicable when the presence of NACK_SN_range field in the STATUS PDU is indicated by an extension bit. In some other embodiments, the existence of the NACk_SN_end field may be indicated via the last value of NACK_SN_range. For example, the last value of the NACK_SN_range may be shown as a bit sequence of 1 s, such as 111. This may be applicable when the NACK_SN_range field is always present in the STATUS PDU following each NACK_SN.

The NACK_SN_range field size may be configurable by the network. In some embodiments, for example, the NACK_SN_range field size may be determined by the RLC SN size configured, and the byte of the last bit of the corresponding NACK_SN may be filled so as to end in the status report. The above embodiment may ensure that the byte alignment may be achieved. In another embodiments, a control type field, which may be located in a header, may specify the length of NACK_SN_range field used in a status report.

FIG. 3 illustrates an example of a status report. In particular, FIG. 3 illustrates an embodiment in which the existence of NACK_SN_range field may not be explicitly indicated by an extension bit, but rather the NACK_SN_range field may follow every NACK_SN indicated. The status report may include an RLC control PDU header and a STATUS PDU payload. RLC control PDU header may include, for example, data or control (D/C) field that specifies whether the PDU is a data or a control PDU. The RLC control PDU header may also include a control PDU type (CPT) field that specifies the control PDU type. The STATUS PDU payload may start with the first bit following the RLC control PDU header.

As can be seen in FIG. 3, NACK_SN_range field 310 may follow every NACK_SN field 320 indicated. In certain embodiments, consecutive NACK_SNs do not exceed the maximum indicated by NACK_SN_Range. In embodiments in which consecutive NACK_SNs exceed the maximum, however, the NACK_SN_end field may follow the NACK_SN_range value '111'. In embodiments in which consecutive NACK_SNs do not exceed the maximum that may be indicated by the NACK_SN_range, SO_start and SO_end fields may follow the set. In other embodiments, consecutive NACK_SNs exceed the maximum that can be indicated by NACK_SN_range, the NACK_SN_end field follows with NACK_SN range value '111'. SO_start field and SO_end field may follow the set.

The E1 bit in FIG. 3 may indicate whether a set of E bits, NACK_SN, NACK_SN_range, NACK_SN_end, and/or SO fields may or may not follow. The E2 bit may indicate whether SO fields may follow the corresponding set of NACK_SN, NACK_SN_range, and/or possible NACK_SN_end. When E2 indicates that the SO fields may follow the corresponding set of NACK_SN, NACK_SN_range, and possible NACK_SN_end, the SO_start field that may relate to the end SN of the NACK_SN_range, and/or SO_end field that may relate to the NACK_SN or other way around. The end SN of the NACK_SN_range, in some examples, may be indicated by NACK_SN_range itself or with the NACK_SN_end.

In some other embodiments, a restriction may be specified that NACK_SN_range or NACK_SN_end may not be used when SO_start and SO_end may follow the NACK_SN. For example, when E2 is set to 1, SO_start and SO_end may follow the NACK_SN. In certain embodiments, the status report may also optionally or conditionally include a SO of an ACK_SN when the next not yet received and/or not yet reported SDU segment is missing. In the embodiment shown in FIG. 3, the overhead may be minimized in all possible scenarios, including when consecutive or non-consecutive PDUs are lost.

FIG. 4 illustrates an example of a flow diagram according to certain embodiments. In particular, FIG. 4 illustrates a method performed by a receiving RLC entity. In step 410, the receiving entity may determine a negative acknowledgment sequence number range. The negative acknowledgment sequence number range may include a plurality of consecutive radio link control missing sequence numbers. In step 420, the receiving entity may determine at least one of a negative acknowledgment end sequence number when the plurality of consecutive radio link control missing sequence numbers exceeds the at least one negative acknowledgment sequence number range.

In step 430, the receiving entity may send a radio link control status report comprising at least one of a negative acknowledgment sequence number, the negative acknowledgment sequence number range, or the negative acknowledgment end sequence number when the plurality of consecutive radio link control missing sequence numbers exceeds the negative acknowledgment sequence number range. When the negative acknowledgment sequence number range is exceeded, the negative acknowledgment end sequence number may follow the negative acknowledgment sequence number range in the status report. The negative acknowledgment sequence number may indicate a negative acknowledgment start sequence number. When the negative acknowledgment sequence number range is exceeded, the negative acknowledgment end sequence number may indicate an end value of the negative acknowledgment sequence number range.

FIG. 5 illustrates an example of a flow diagram according to certain embodiments. In particular, FIG. 5 illustrates a method performed by a transmitting RLC entity. In step 510, the transmitting entity may transmit the segmented service data units comprising radio link control sequence numbers. In step 520, the transmitting entity may receive a radio link control status report comprising at least one of a negative acknowledgment sequence number, a negative acknowledgment sequence number range, or a negative acknowledgment end sequence number when a plurality of consecutive radio link control missing sequence numbers exceeds the at least one negative acknowledgment sequence number.

Figures 6, 7:
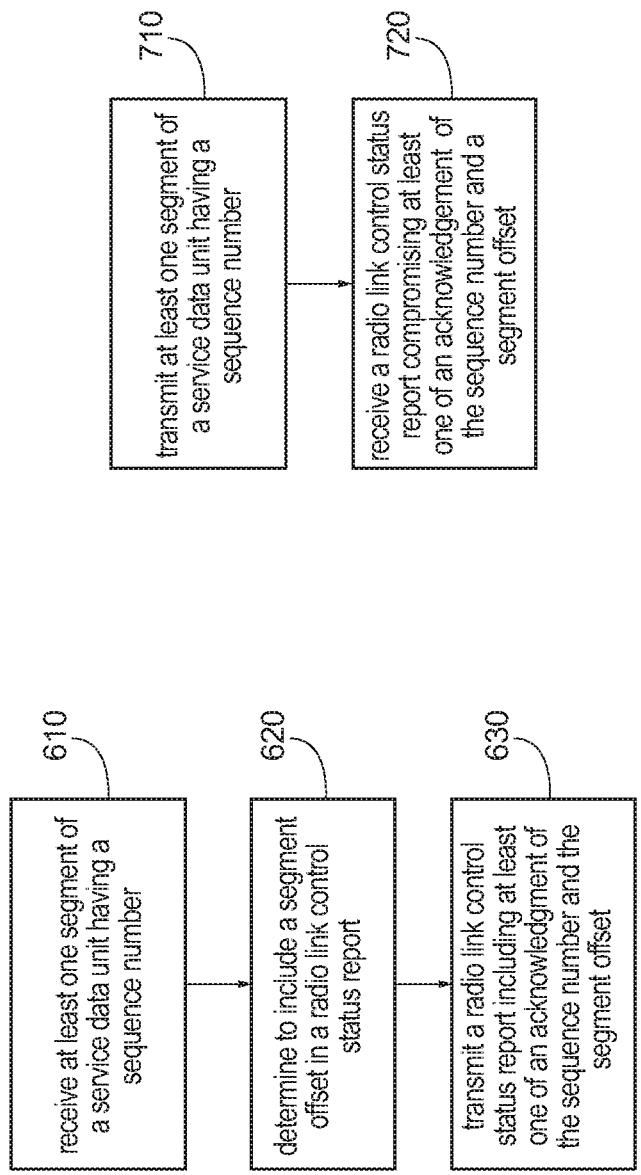
FIG. 6 illustrates an example of a flow diagram according to certain embodiments.
FIG. 7 illustrates an example of a flow diagram according to certain embodiments.

FIG. 6 illustrates an example of a flow diagram according to certain embodiments. In particular, FIG. 6 illustrates a method performed by a receiving RLC entity. In step 610, the receiving entity may receive at least one segment of a service data unit having a sequence number. The service data unit may include at least one other segment. In step 620, the receiving entity may determining to include a segment offset in a radio link control status report when the at least one other segment of the service data unit has not yet been received.

In step 630, the receiving entity may transmit a radio link control status report comprising at least one of an acknowledgement of the sequence number and the segment offset when the at least one other segment of the service data unit has not yet been received. In addition, the receiving entity may also transmit the radio link control status report comprising a segment offset start and a segment offset end to indicate the received at least one segment when the received at least one segment is located in a middle of the service data unit. The received at least one segment may be a last segment of the service data unit. In certain embodiments, when the received at least one segment is a first segment of the service data unit, the segment offset may indicate an end byte of the received at least one segment.

FIG. 7 illustrates an example of a flow diagram according to certain embodiments. In particular, FIG. 7 illustrates a method performed by a transmitting RLC entity. In step 710, the transmitting entity may transmit at least one segment of a service data unit having a sequence number.

The service data unit may comprise at least one other segment. In step 720, the transmitting entity may receive a radio link control status report comprising at least one of an acknowledgement of the sequence number and a segment offset when at least one other segment of the service data unit has not yet been transmitted. In addition, the method may also include receiving the radio link control status report comprising a segment offset start and a segment offset end to indicate the transmitted at least one segment when the transmitted at least one segment is located in a middle of the service data unit.

Applying the LTE procedure for RLC status reporting in NR may lead to inaccurate reporting of segments that have either not been or have just been sent. Certain embodiments, therefore, avoid the early reporting of not transmitted yet or still ongoing segment should be avoided. To mimic the behavior in LTE, simple extensions on top of the LTE baseline may be used to keep track of the highest SO along with the highest SN among the received RLC data PDUs. In such embodiments, t-reordering should be started when a gap is created by either a segment or a full PDU, and ACK_SN field in the status report should optionally follow an SO field which may indicate the byte offset of the next not received segment of ACK_SN, which may not be reported as missing in the status report.

In some embodiments, a receiving RLC entity may keep track of the highest SO along with the highest SN among the received RLC data PDUs to be used in the status report. As discussed above, t-reordering may be started when a gap is created by either a segment or a full PDU, and the SO of the next expected segment may be recorded for the status report. In other embodiments, a ACK_SN may follow an optional SO field in the RLC STATUS PDU to indicate the byte offset of the next not received segment of ACK_SN, which may not be reported as missing in the status report.

Figure 8:
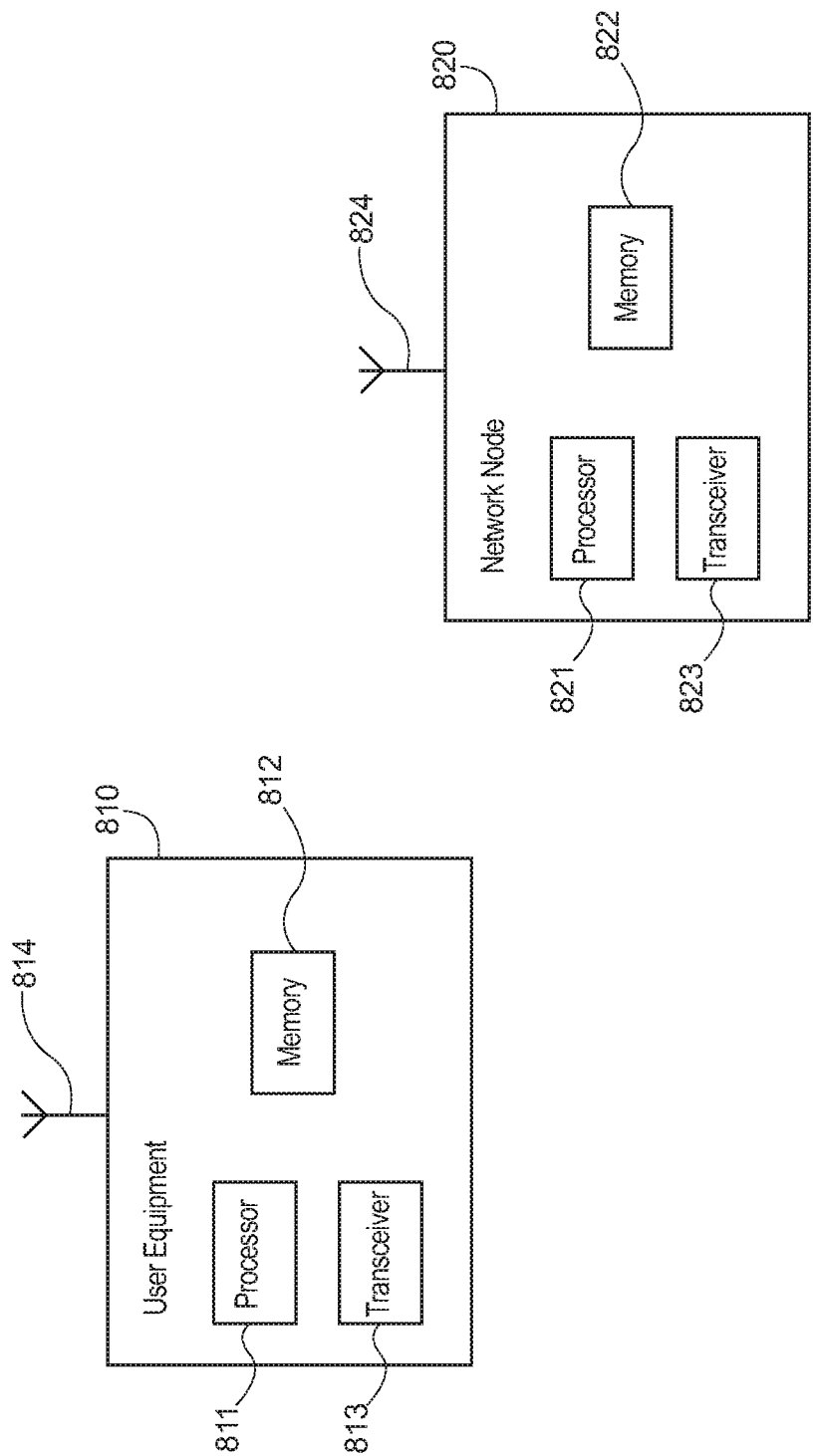
FIG. 8 illustrates an example of a system according to certain embodiments.

FIG. 8 illustrates a system according to certain embodiments. It should be understood that each signal or block in FIGS. 1-7 may be implemented by various means or their combinations, such as hardware, software, firmware, one or more processors and/or circuitry. In one embodiment, a system may include several devices, such as, for example, network entity 820 or user equipment (UE) 810. The system may include more than one UE 810 and more than one network entity 820. Network entity 820 may be a base station, a network node, an access point, an access node, a NR NodeB, a server, a host, or any other network core entity that may communicate with the UE. The network entity may include the user plane radio protocol layers shown in FIG. 1. In certain embodiments, the network entity may be an RLC transmitting entity.

Each of these devices may include at least one processor or control unit or module, respectively indicated as 811 and 821. At least one memory may be provided in each device, and indicated as 812 and 822, respectively. The memory may include computer program instructions or computer code contained therein. One or more transceiver 813 and 823 may be provided, and each device may also include an antenna, respectively illustrated as 814 and 824. Although only one antenna each is shown, many antennas and multiple antenna elements may be provided to each of the devices. Other configurations of these devices, for example, may be provided. For example, network entity 820 and UE 810 may be additionally configured for wired communication, in addition to wireless communication, and in such a case antennas 814 and 824 may illustrate any form of communication hardware, without being limited to merely an antenna.

Transceivers 813 and 823 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or UE 810 may be a mobile station (MS) such as a mobile phone or smart phone or multimedia device, an IoT cellular device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor, meter, or robot. In certain embodiments, the UE may be an RLC receiving entity.

In some embodiments, an apparatus, such as a user equipment or a network entity, may include means for carrying out embodiments described above in relation to FIGS. 1-7. In certain embodiments, at least one memory including computer program code can be configured to, with the at least one processor, cause the apparatus at least to perform any of the processes described herein.

Processors 811 and 821 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 812 and 822 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 820 or UE 810, to perform any of the processes described above (see, for example, FIGS. 1-7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C #, Java, etc., or a low-level programming language, such as a machine language, or assembler. Alternatively, certain embodiments may be performed entirely in hardware.

The above embodiments may provide for significant improvements to the functioning of a network and/or to the functioning of the network entities within the network, or the user equipment communicating with the network. For example, the above embodiments may help to minimize the overhead in all possible scenarios, including scenarios when consecutive or non-consecutive PDUs may be lost. Some embodiments may also allow for correct reporting via a status report of the segments received by the receiving entity. The status report may not request the retransmission of a segment that has yet to be transmitted at all, or that was received by the receiving entity after the receiving entity stopped taking into account further transmissions.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR technology, the above embodiments may also apply to any other 3GPP technology, such as IoT technology, LTE, LTE-advanced, and/or fourth generation (4G) technology.

Partial Glossary
3GPP 3rd generation partnership project
MAC Medium Access Control
NR New Radio
PDCP Packet Data Convergence Protocol
PDU Protocol Data Unit
RLC Radio Link Control
SDU Service Data Unit
TBS Transport Block Size
AM Acknowledged Mode
CA Carrier Aggregation
DC Dual Connectivity
HARQ Hybrid ARQ
SN Sequence Number
TTI Transmission Time Interval
UM Unacknowledged Mode According to a first embodiment, a method may include determining a negative acknowledgment sequence number range. The negative acknowledgment sequence number range includes a plurality of consecutive radio link control missing sequence numbers. The method may also include determining at least one of a negative acknowledgment end sequence number when the plurality of consecutive radio link control missing sequence numbers exceeds the negative acknowledgment sequence number range. In addition, the method may include sending a radio link control status report comprising at least one of a negative acknowledgment sequence number, the negative acknowledgment sequence number range, or the negative acknowledgment end sequence number when the plurality of consecutive radio link control missing sequence numbers exceeds the at least one negative acknowledgment sequence number range.

In a variant, when the negative acknowledgment sequence number range is exceeded, the negative acknowledgment end sequence number may follow the negative acknowledgment sequence number range in the status report.

In another variant, the negative acknowledgment sequence number may indicate a negative acknowledgment start sequence number.

In a further variant, when the negative acknowledgment sequence number range is exceeded, the negative acknowledgment end sequence number may indicate an end value of the negative acknowledgment sequence number range.

According to a second embodiment, a method may include transmitting segmented service data units comprising radio link control sequence numbers. The method may also include receiving a radio link control status report comprising at least one of a negative acknowledgment sequence number, a negative acknowledgment sequence number range, or a negative acknowledgment end sequence number when a plurality of consecutive radio link control missing sequence numbers exceeds the at least one negative acknowledgment sequence number range.

In another variant, when the negative acknowledgment sequence number range is exceeded, the negative acknowledgment end sequence number may follow the negative acknowledgment sequence number range in the status report.

In a variant, when the negative acknowledgment sequence number range is exceeded, the negative acknowledgment end sequence number may indicate an end value of the negative acknowledgment sequence number range.

According to a third embodiment, a method may include receiving at least one segment of a service data unit having a sequence number. The service data unit may include at least one other segment. The method may also include determining to include a segment offset in a radio link control status report when the at least one other segment of the service data unit has not yet been received. In addition, the method may include transmitting a radio link control status report including at least one of an acknowledgement of the sequence number and the segment offset when the at least one other segment of the service data unit has not yet been received.

In a variant, a next expected packet data unit may be a segment.

In another variant, a timer may be started when a gap is created and the gap is created by at least one of a not yet received PDU, full SDU, or the PDU of a SDU segment. When the timer is started, the sequence number and the segment offset, which indicates an end byte of the segment or a next byte not yet received, may be recorded to be used in the status report as an acknowledgment sequence number and the segment offset, respectively.

In a variant, the method may include transmitting the radio link control status report comprising a segment offset start and a segment offset end to indicate the received at least one segment when the received at least one segment is located in a middle of the service data unit.

In a further variant, the received at least one segment may be a last segment of the service data unit.

In another variant, when the received at least one segment is a first segment of the service data unit, the segment offset may indicate an end byte of the received at least one segment.

According to a fourth embodiment, a method may include transmitting at least one segment of a service data unit having a sequence number, wherein the service data unit comprises at least one other segment. The method may also include receiving a radio link control status report comprising at least one of an acknowledgement of the sequence number and a segment offset when at least one other segment of the service data unit has not yet been transmitted.

In a variant, the method may include receiving the radio link control status report comprising a segment offset start and a segment offset end to indicate the transmitted at least one segment when the transmitted at least one segment is located in a middle of the service data unit.

In addition, a variant may include that the transmitted at least one segment may be a last segment of the service data unit.

Further, a variant may include that when the transmitted at least one segment is a first segment of the service data unit, the segment offset may indicate an end byte of the received at least one segment.

According to a fifth embodiment, sixth embodiment, seventh embodiment, and eighth embodiment, an apparatus can include at least one processor and at least one memory and computer program code. The at least one memory and the computer program code can be configured to, with the at least one processor, cause the apparatus at least to perform a method according to the first embodiment, second embodiment, third embodiment, or the fourth embodiment, and any of its variants.

According to a ninth embodiment, tenth embodiment, eleventh embodiment, and a twelfth embodiment, an apparatus can include means for performing the method according to the first embodiment, second embodiment, third embodiment, or fourth embodiment, and any of its variants.

According to an thirteenth embodiment, fourteenth embodiment, fifteenth embodiment, and sixteenth embodiment, a computer program product may encode instructions for performing a process including a method according to the first embodiment, second embodiment, third embodiment, or fourth embodiment, and any of its variants.

According to a seventeenth embodiment, eighteenth embodiment, nineteenth embodiment, and twentieth embodiment, a non-transitory computer-readable medium may encode instructions that, when executed in hardware, perform a process including a method according to the first embodiment, second embodiment, third embodiment, or fourth embodiment, and any of its variants.

According to a twenty first embodiment, twenty second embodiment, twenty third embodiment, and twenty fourth embodiment, a computer program code may include instructions for performing a method according to the first embodiment, second embodiment, third embodiment, or fourth embodiment, and any of its variants.

We claim:

1. An apparatus comprising:

at least one processor; and at least one memory including computer program code;

the at least one memory and the computer program code configured to, with the at least one processor, cause the apparatus at least to:

receive at least one segment of a service data unit having a sequence number;

start a timer when a gap is created, wherein the gap is created by at least one not yet received service data unit segment; and transmit a radio link control status report comprising a negative acknowledgment sequence number, an extension bit indicating presence of a negative acknowledgment sequence number range field, and a negative acknowledgment sequence number range, wherein, in presence of the negative acknowledgment sequence number range field, a negative acknowledgment end sequence number is indicated by the negative acknowledgment sequence number and the negative acknowledgment sequence number range, a segment offset start is related to the negative acknowledgment sequence number, and a segment offset end is related to the negative acknowledgment end sequence number.

2. An apparatus as in claim 1, wherein the service data unit comprises at least one other segment.

3. An apparatus as in claim 2, wherein the at least one memory and the computer program code configured to, with the at least one processor, cause the apparatus at least to determine to include a segment offset in a radio link control status report when the at least one other segment of the service data unit has not yet been received.

4. An apparatus as in claim 3, wherein, when the timer is started, the sequence number and the segment offset are recorded to be used in the status report as an acknowledgment sequence number and the segment offset, respectively.

5. A method, comprising:

receiving at least one segment of a service data unit having a sequence number;

starting a timer when a gap is created, wherein the gap is created by at least one not yet received service data unit segment; and transmitting a radio link control status report comprising a negative acknowledgment sequence number, an extension bit indicating presence of a negative acknowledgment sequence number range field, and a negative acknowledgment sequence number range, wherein, in presence of the negative acknowledgment sequence number range field, a negative acknowledgment end sequence number is indicated by the negative acknowledgment sequence number and the negative acknowledgment sequence number range, a segment offset start is related to the negative acknowledgment sequence number, and a segment offset end is related to the negative acknowledgment end sequence number.

6. A method as in claim 5, wherein the service data unit comprises at least one other segment.

7. A method as in claim 6, comprising: determining to include a segment offset in a radio link control status report when the at least one other segment of the service data unit has not yet been received.

8. A method as in claim 7, wherein, when the timer is started, the sequence number and the segment offset are recorded to be used in the status report as an acknowledgment sequence number and the segment offset, respectively.

\* \* \* \* \*